United States Patent Office 2,912,903
Patented Nov. 17, 1959

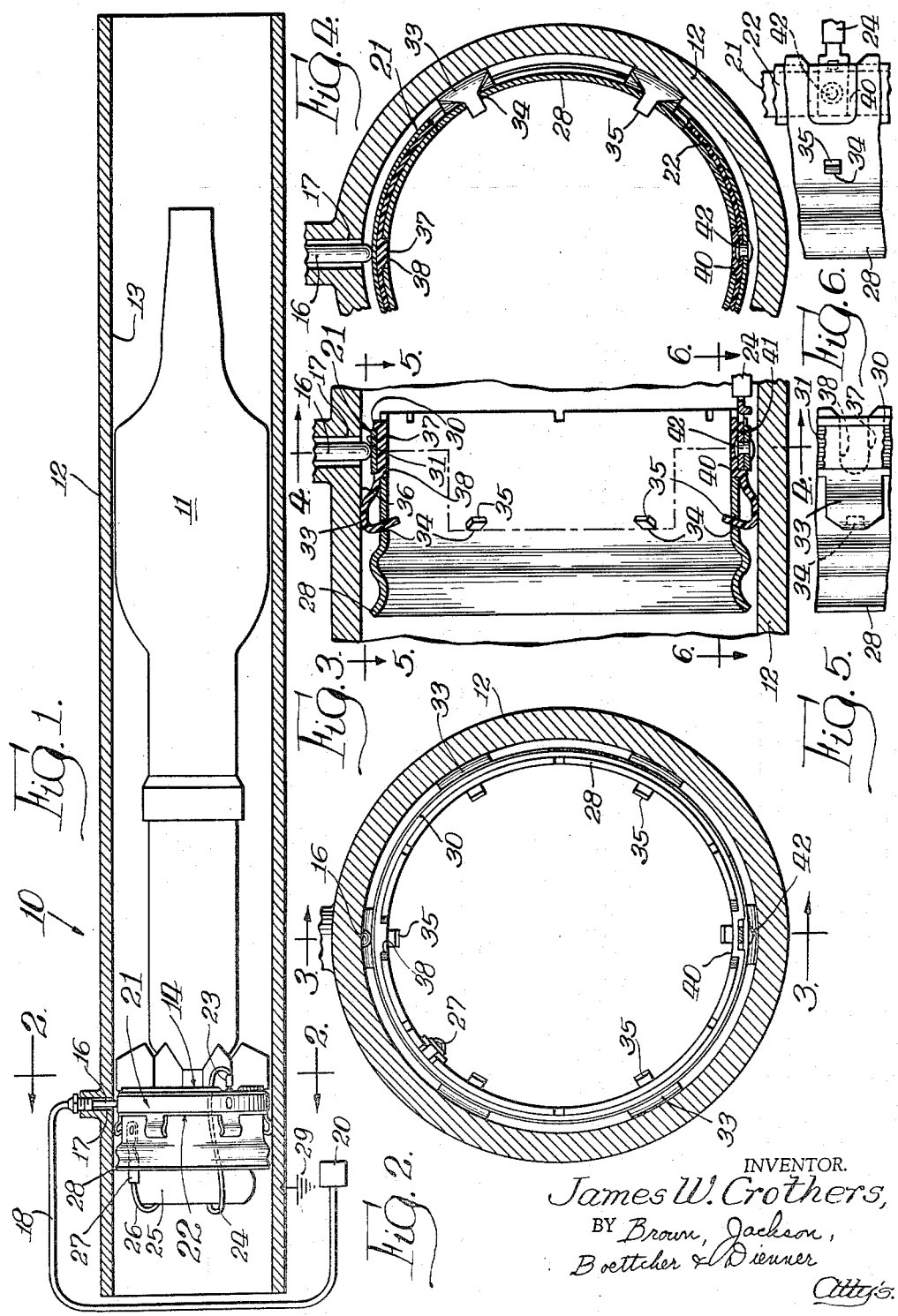

2,912,903

INSULATOR RING

James W. Crothers, Fort Atkinson, Wis., assignor, by mesne assignments, to the United States of America as represented by the Secretary of the Army Application November 25, 1957, Serial No. 698,424

2 Claims. (Cl. 89—1.7)

This invention relates, in general, to a means of insulating electrical contacts and, in particular, to a new and improved insulator ring useable in combination with a contact ring as a contact ring centering device especially useful in rockets which will permit the entire combination to slide freely and being located within a bore or tube of a rocket launching mechanism without recourse to close tolerances.

In the past development of rockets, it was desirable to maintain very close manufacturing tolerances in order to obtain ballistic accuracy, but because of the high costs resulting from these close tolerances, much larger tolerances were necessary. This invention provides an inexpensive means of disposing a contact ring in a rocket launcher tube to provide an electrical contact between a suitable current source and a rocket motor such that the contact ring is electrically insulated from other metal parts and being centrally located with respect to such metal parts, thereby contributing to greater ballistic accuracy.

It is accordingly a general object of my invention to improve prior art insulator and contact ring particularly useful in rocket launching devices.

Still another primary object of my invention is to provide a new and improved insulator ring and contact ring useable as a combination whereby the metal contact ring is insulated from other metal parts and, the insulator ring, in addition to its insulating function, is a close fit and centering device providing a means of centering the contact ring within a bore or within a launching tube without recourse to close manufacturing tolerances.

Briefly, my invention comprises an insulator ring of soft, pliable plastic having insulating qualities useable in combination with a metallic electrical contact ring. The insulator ring is provided with a plurality of tabs which cooperate with means such as a cylinder upon which the insulator ring and contact ring, as an assembly, are mounted to form arched sections, which sections provide the assembly with an outer periphery which is larger than the inner periphery of the tube or bore into which the assembly is to be inserted. The tabs, because of their largeness and compressability, compress and form effective spacers for the contact ring, thus not only insulating it from the cylinder on which it is mounted, but spaces it from the inner periphery of the tube or bore and allows the entire combination to slide freely yet be centrally located within the tube or bore.

Other and more particular objects of my invention will be apparent to those skilled in the art from the following description and drawings forming a part thereof and wherein:

Fig. 1 is a longitudinal cross-sectional view of a rocket launching tube, in which my invention is typically installed;

Fig. 2 is an enlarged cross-sectional view taken along line 2—2 in Fig. 1, looking in the direction of the arrows and showing to advantage my insulator ring and contact ring in assembled relationship as disposed with respect to other parts of the rocket launching tube;

Fig. 3 is an enlarged detail view, taken along line 3—3 of Fig. 2, looking in the direction of the arrows and showing to advantage the relationship of my insulator ring and contact ring with the inner periphery of the launching tube;

Fig. 4 is an enlarged detail view taken along line 4—4 of Fig. 3 and looking in the direction of the arrows and showing to advantage one portion of the construction of my insulator ring;

Fig. 5 is an enlarged detail view taken along line 5—5 in Fig. 3 and looking in the direction of the arrows; and Fig. 6 is an enlarged detail view taken along lines 6—6 of Fig. 3 and looking in the direction of the arrows.

Turning now to the drawings and particularly to Fig. 1 thereof, to explain my invention in its typical operative function, there is shown, semi-schematically, a rocket launching device, indicated in its entirety as 10 with a rocket 11 disposed therein. The rocket launching device comprises generally, a launcher tube 12 having a hollow cylindrical inner surface 13 into which is inserted the rocket 11 with its rocket motor igniting assembly indicated in its entirety as 14. A spring actuated metallic shot pin contact means 16 is disposed in a bore 17 provided in the launcher tube and extends radially inwardly and is further connected by a wire 18 to a suitable source of electric power 20. The spring actuated shot pin contact means 16 electrically engages a contact ring 21 which is insulated, electrically, from the remaining parts of the launcher assembly by an insulator ring 22. Insulator ring 22 is suitably formed, as will be explained in detail hereinafter, whereby the ring can make electrical contact with a terminal 23 to connecting wire 24 to a squib (not shown) in a rocket motor 25 containing the rocket propellant (not shown). A complete circuit for igniting the squib is made through wire 26, ground terminal 27 connected to a cylindrical ring 28 and thence to ground as indicated at 29. Since the details of construction of the rocket motor 25 and the squib is conventional and not a part of this invention, no further detailed description thereof is deemed necessary.

As hereinabove mentioned, an outstanding feature of my present invention is a means of insulating the contact ring 21 from the remainder of the metal parts in the launching tube and in the rocket assembly which will permit the entire assembly 11 and 14 to slide freely in the launcher tube and be centrally located therewithin, without recourse to close tolerances. To provide this function, attention is now invited to Figs. 2–6 of the drawings wherein there is shown in detail, my insulator ring 22, of suitable plastic material having electrical insulating qualities, as it cooperates with the contact ring 21 and the inner bore 13 of the launching tube 12. It can be seen that my insulating ring 22 comprises a relatively flat, relatively thin main body portion 30 suitably recessed on its exterior, as indicated at 31, to receive the relatively flat, relatively thin, circular, cylindrical contact ring 21 and having a plurality of relatively thin, relatively long tabs 33. When the insulator ring 22 and contact ring 21 are mounted on the cylindrical hollow metal cylinder 28 which is provided with equally spaced slots 34 about its periphery, the tabs 33 and their relatively narrow ends or ears 35 are inserted in the slots 34. Insertion of such ears 35 causes the tabs to form radially outwardly extending arched sections, indicated in their entirety as 36, and which when inserted into the hollow launching tube 12, will make contact with the inner wall 13 thereof. Since the diameter of the insulator ring as formed by the arched sections 36 is greater than the internal diameter of the launching tube, the tabs will compress and form effective spacers. Thus, the insulator ring 22 serves two purposes—it insulates the contact ring from the inner cylinder 28 on which the ring is mounted and allows the entire assembly to slide freely and be centrally located within the launching tube without recourse to close tolerances.

To further precisely locate the insulator ring 22 and contact ring 21 on the cylinder 28, the insulating ring is provided with a radially inwardly extending U-shaped locating protuberance 37 as shown in Figs. 3 and 5 which fits snugly within a complementary U-shaped locating slot 38 in the ring 28. The function of the locating protuberance 37 and locating slot 38 is to prevent the insulator ring 22 from moving about and to lock the rings in a longitudinal relation with respect to the slots 34. The insulator ring 22 is further provided with a radially inwardly extending U-shaped contact protuberance 40 as shown in Figs. 3 and 6 to accommodate an electrical contact means 41 disposed on the radially inner side of the contact ring 21 and suitably affixed thereto as by rivets 42. This contact means connects the wire 24 to the squib as hereinabove mentioned.

With these last mentioned protuberances, the insulator ring fully accomplishes the two purposes mentioned above, i.e., to function as an inexpensive, convenient means of centering and insulating the contact ring within the launching tube. It can be seen also that such an insulator ring with the tabs 33 to form the arches 36 does not require close manufacturing tolerances as normally required in prior art devices to suitably center the contact ring and electrically insulate it so that it may perform its function during operation.

It is to be understood that while I have shown and described my insulating ring and close fit device in connection with locating and insulating a contact ring in a rocket launching tube, my invention is equally adaptable wherever it is necessary to locate a contact ring within a bore so as to insulate it and to space it from the other electrical conductive elements and wherein the various parts of my invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention and the invention is defined and comprehended solely by the appended claims.

I claim:

1. A contact ring assembly centering device for centering the ring assembly within a launching tube including a cylinder adapted for attachment to a rocket having a plurality of circumferentially spaced apertures therein, a resilient, plastic, electrically non-conductive ring mounted on and surrounding said cylinder, said plastic ring having a plurality of integrally formed tabs extending therefrom, said tabs being outwardly arched and having the free ends thereof received in the apertures of said cylinder, and an electrically conductive contact ring mounted on and surrounding said plastic ring, said arched tabs being compressible upon contact with said launching tube to center and peripherally space the assembly in the launching tube.

2. In a rocket launching device, a launching tube, a current source for an electrical firing assembly for a rocket motor, a contact on the inner periphery of said tube connected to said current source, a rocket motor contacting cylinder having a plurality of circumferentially spaced apertures, an insulator ring formed of resilient plastic material mounted on said cylinder, said insulator ring being provided with a plurality of integral tabs which are outwardly arched and received in the apertures of said cylinder and having a radial extent greater than the inside diameter of said launching tube, a contact ring surrounding said insulator ring, said cylinder, insulator ring and contact ring being received and centered in and peripherally spaced from said launching tube with said arched tabs being radially compressed and said contact ring in engagement with said contact.

References Cited in the file of this patent
UNITED STATES PATENTS

| 1,661,091 | Riabouchinski | Feb. 28, 1928 |
| 2,460,929 | Goff | Feb. 8, 1949 |
| 2,469,350 | Lauritsen | May 10, 1949 |
| 2,645,999 | Bogard | July 21, 1953 |